June 16, 1959   R. E. WESTLUND, JR   2,890,732
RECIPROCATING SAW
Filed Jan. 13, 1958

RAYMOND E. WESTLUND, Jr.
INVENTOR.

BY J. O. St. Palley
Patent Agent

United States Patent Office 2,890,732
Patented June 16, 1959

2,890,732

RECIPROCATING SAW

Raymond E. Westlund, Jr., East Haven, Conn.

Application January 13, 1958, Serial No. 708,648

1 Claim. (Cl. 145—31)

My invention relates to improvements in reciprocating saws, and more particularly to improvements in the means of securing saw blades in reciprocating saws.

In the present art some sawing operations require the employment of a variety of saw blades in the reciprocating saws, making it necessary to exchange the saw blades at frequent intervals during the work. Under such conditions the easy and quick replaceability of the saw blades has great utility as it increases the efficiency of the operator.

The principal object of my invention is to provide a reciprocating saw in which the saw blade can be removed and replaced very quickly and conveniently.

Another important object of my invention is to provide a reciprocating saw employing a novel and improved means for securing the saw blade, which is applicable very advantageously both in manual and power driven reciprocating saws.

Other objects and advantages of my invention will be apparent during the course of the following description.

Figure 1:
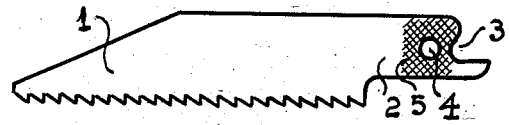
Figure 2:
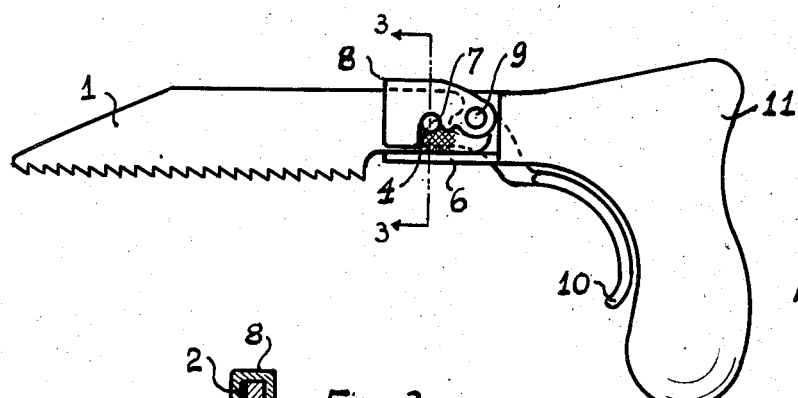
Figure 3:
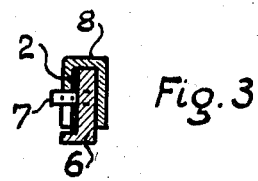
Figure 4:
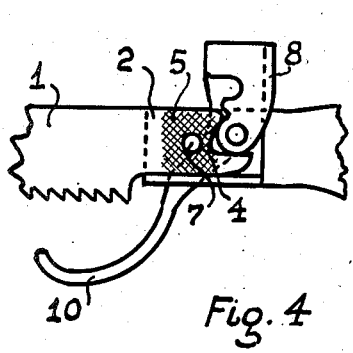
Figure 5:
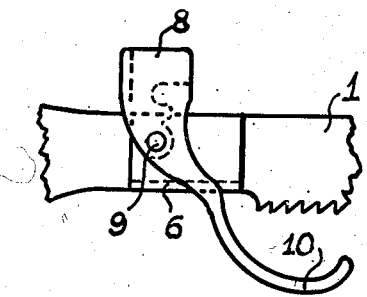

In the accompanying drawing, forming a part of the present application, wherein like numerals are employed to designate like parts, Figure 1 is a side view of the saw blade, Figure 2 is a side view of the preferred form of the assembled reciprocating saw, Figure 3 is a sectional view through the line 3—3 of Figure 2, Figure 4 is a fragmentary view showing the saw blade securing means in the open position, Figure 5 is a fragmentary view of the same as seen from the opposite side.

In the drawing, wherein for the purpose of illustration is shown a preferred form of my invention, the numeral 1 designates the saw blade used in my reciprocating saw. The cutting portion of the saw blade 1, comprising the teeth, is of the customary construction and may vary in size, and shape of the blade and the teeth. The distinguishing features of the blade 1 which make its novel and improved securing possible, are associated with the tang 2 of the blade 1, and consist of the slot 3, having open end and divergent sides, the hole 4 adjacent to the base of the slot 3, and the knurling 5 of the surface of the tang 2 adjacent to the hole 4. A preferred form of the saw blade 1, with the above mentioned features, is illustrated in Fig. 1 of the drawing.

For the securing of this saw blade 1 my invention employs the following elements: A blade holder 6, having an L-shaped cross section shown in Fig. 3, and rectangular front and back surfaces illustrated in Figs. 4 and 5, respectively. The stud 7, secured to the front of said blade holder 6, and so dimensioned as to closely fit the hole 4 of the blade 1. The U-clamp 8 pivotally connected to the blade holder 6 by means of the pin 9. Secured to this U-clamp is the operating lever 10 by which the U-clamp can be rotated around the said pin 9 to assume the closed position shown in Fig. 2 or the open position shown in Figs. 4 and 5; Fig. 4 being a frontal view and Fig. 5 a back view of the U-clamp and the associated parts.

It is essential in this invention that the U-clamp is so constructed as to permit in its open position the insertion of the tang 2 of the blade 1 over the L-shaped extension of the blade holder 6, with the hole 4 of the blade surrounding the stud 7 of said blade holder, as illustrated in Fig. 4. It is also essential that this U-shaped clamp in its closed position, shown in Figs. 2 and 3, will exert a strong pressure on the tang 2 of the blade, clamping said tang firmly to the blade holder 6. For this reason the U-clamp 8 is made of strong resilient material, such as spring steel. The knurling 5 on the tang 2 is obtained by providing closely spaced depressions of very small depth and width in the surface of the tang and serves to increase the friction between the U-clamp 8 and the tang 2 in order to prevent an accidental opening of said clamp.

In the preferred form of my invention, shown in Fig. 2, the blade holder 6 is secured to a manual handle 11 and the operating lever 10 is formed particularly to suit manual gripping. It is, however, within the spirit of my invention to secure the blade holder 6 to any mechanical device known in the art and used to operate reciprocating saws, and to modify the shape of the lever 10.

The operation of my invention is as follows. By means of the operating lever 10 the U-clamp 8 is moved into the open position, the blade 1 is inserted and the U-clamp is moved back into the closed position, making the saw ready for use.

It is to be understood that the form of my invention shown and described is only a preferred example of the same and that various changes in the shape, size and arrangement of parts may be resorted to without departing from the spirit of my invention or the scope of the subjoined claim.

I claim:

A reciprocating saw comprising a saw blade having a tang provided with an open end slot with divergent sides, said tang having also a hole adjacent to said slot and knurling adjacent to said hole; a blade holder having an extension L-shaped in cross-section; a stud secured to said blade holder and being dimensioned to fit said hole; a U-clamp pivotally mounted on said blade holder and being adapted to permit, in its open position, the insertion of said tang over one leg of the L-shaped extension, with said hole surrounding said stud, said clamp, in its closed position, embracing said one leg and said tang so as to exert a strong pressure on said tang, thereby clamping said tang firmly to said blade holder; an operating lever secured to said U-clamp to rotate said clamp around said pivotal mounting from one of the positions into the other; actuating means connected to said blade holder producing a reciprocating motion for the operation of the saw.

References Cited in the file of this patent

UNITED STATES PATENTS

| | | |
|---|---|---|
| 931,778 | Levinsohn | Aug. 24, 1909 |
| 1,058,866 | Huffschmitt | Apr. 15, 1913 |
| 2,747,631 | Behlefeldt | May 29, 1956 |

FOREIGN PATENTS

| | | |
|---|---|---|
| 2,506,636 | Italy | Nov. 3, 1926 |